(12) United States Patent
La Grange et al.

(10) Patent No.: US 7,786,215 B2
(45) Date of Patent: Aug. 31, 2010

(54) THERMOPLASTIC POLYMER, USE THEREOF IN POLYAMIDE COMPOSITIONS WITH IMPROVED HYDROPHILY AND ANTI-STATICITY

(75) Inventors: Jean-Paul La Grange, Lyons (FR);
Christophe Paulo, Lyons (FR);
Jean-François Sassi, Millery (FR);
Franck Touraud, Vernon (FR);
Christine Vidil, Communay (FR)

(73) Assignee: Rhodianyl, Boulougne-Billancourt Cedex (FR)

( * ) Notice: Subject to any disclaimer, the term of this patent is extended or adjusted under 35 U.S.C. 154(b) by 360 days.

(21) Appl. No.: 10/481,184

(22) PCT Filed: Jun. 27, 2002

(86) PCT No.: PCT/FR02/02228

§ 371 (c)(1),
(2), (4) Date: Jul. 6, 2004

(87) PCT Pub. No.: WO03/002668

PCT Pub. Date: Jan. 9, 2003

(65) Prior Publication Data

US 2004/0242788 A1    Dec. 2, 2004

(30) Foreign Application Priority Data

Jun. 28, 2001    (FR) .................................. 01 08522

(51) Int. Cl.
*C08G 65/48* (2006.01)
*C08G 69/02* (2006.01)
*C08G 69/40* (2006.01)
*C08G 81/00* (2006.01)
*C08L 71/02* (2006.01)

(52) U.S. Cl. ...................... 525/88; 525/92 A; 525/92 B; 525/92 F; 525/92 H; 525/403; 525/406; 525/410; 525/419; 525/420

(58) Field of Classification Search .................. 525/88, 525/92 A, 92 B, 92 F, 92 H, 403, 406, 410, 525/419, 420
See application file for complete search history.

(56) References Cited

U.S. PATENT DOCUMENTS

| 4,244,862 | A | * | 1/1981 | Handa et al. | ................. | 524/505 |
| 4,331,786 | A | * | 5/1982 | Foy et al. | ..................... | 525/408 |
| 4,727,133 | A | * | 2/1988 | Liedloff | ...................... | 528/288 |
| 4,806,598 | A | * | 2/1989 | Morman | ....................... | 525/63 |
| 5,097,016 | A | * | 3/1992 | Ishii et al. | .................... | 530/350 |
| 5,959,069 | A | | 9/1999 | Gluck et al. | | |
| 2004/0033644 | A1 | * | 2/2004 | Wensel | ....................... | 438/124 |
| 2004/0077780 | A1 | * | 4/2004 | Jeong et al. | ................. | 524/599 |

FOREIGN PATENT DOCUMENTS

| EP | 0 682 070 A | 11/1995 |
| EP | 0 761 715 A | 3/1997 |

OTHER PUBLICATIONS

Baba et al., STN AN 2005;702708 (2005).*

* cited by examiner

*Primary Examiner*—Jeffrey C Mullis
(74) *Attorney, Agent, or Firm*—Buchanan Ingersoll & Rooney PC

(57) ABSTRACT

The invention provides a novel thermoplastic polymer comprising at least one polyalkylene oxide block. It relates to a process for preparing the thermoplastic polymer and to an application of this polymer as a hydrophilicity and/or antistatic modifier, especially in polyamide compositions. These compositions are particularly suitable for the manufacture of yarns, fibres and filaments.

25 Claims, No Drawings

THERMOPLASTIC POLYMER, USE THEREOF IN POLYAMIDE COMPOSITIONS WITH IMPROVED HYDROPHILY AND ANTI-STATICITY

The present invention relates to a thermoplastic polymer comprising at least one polyalkylene oxide block and to its application in polyamide compositions having improved hydrophilicity and/or improved antistatic behaviour.

In the field of the formulation of synthetic materials, it is often sought to modify the antistatic and/or hydrophilic properties so as to give the said material better workability, to make the final product more comfortable in use or to adapt it to the external environment.

In the field of textile yarns, it is sought, for example, to improve the hydrophilicity of polyamides so as to make their properties similar to those of cotton and to provide better comfort to the wearer.

In the field of yarns, fibres and filaments, antistatic behaviour may be necessary for reasons of comfort in use. It makes it possible inter alia to prevent the build-up of electrical charges. One of the effects is, for example, to limit the build-up of dust on flocked surfaces. In addition, the use of an intrinsically antistatic fibre may make it possible to avoid the use, from among the fibres used for producing flocked surfaces, of a highly conducting fibre that is usually strongly coloured.

To improve the hydrophilicity or antistatic behaviour of a polyamide or of polyamide-based compositions, it is known to use compounds having polyether units or to modify the polyamide by inserting polyether units into the structure. Very many documents describe different ways of introducing these units into the polyamide, especially by modifying the polyamide, for example, in the form of polymer blends or copolymer blends, or in combination with the polyamide, for example, in the form of bicomponent fibres.

The document "*Hydrophilic nylon for improved apparel comfort*", Textile Research Journal, June 1985, pages 325-333, describes the manufacture and the properties of a copolymer obtained by the polycondensation of caprolactam and of amine-terminated polyethylene oxides. This is a case of modifying the structure of the polyamide. The copolymer is melt-spun in order to manufacture yarns. The yarns exhibit improved hydrophilicity over a conventional polyamide. However, this method requires the manufacture of special copolymers, and therefore means that the polymerization processes have to be adapted.

Moreover, it is known to introduce compounds having polyether units, especially in textile applications, for example in the form of a size or finish applied to the yarn, fibre, filament or fabric. Since polyether units are partially soluble in water, the effect of the treatment disappears after a few washes.

It may be preferable to modify the properties of the polyamide by adding an agent in the melt. Within the context of the manufacture of spun articles, the agent may, for example, be added to the melt before spinning.

For this purpose, it is known to introduce polyethylene glycol into the polyamide. However, this water-soluble compound is substantially extracted from the compositions in contact with water. Its effect does not last beyond a few washes.

It is also known to introduce random polyester/polyethylene glycol copolymers into the polyamide, but these copolymers are partially dissolved in the washing water.

Finally, compositions are known which are obtained by the addition to the polyamide of random copolymers obtained from caprolactam and amine-terminated polyethylene oxides. These compositions again suffer a relatively substantial loss of properties after washing.

The object of the present invention is to provide a novel thermoplastic polymer comprising at least one polyalkylene oxide block, which can be introduced especially as an additive into a polyamide into the melt before spinning, and does not have the abovementioned drawbacks. The corresponding polyamide-based compositions have in particular, not only lasting hydrophilic properties, but good dye fastness and constant mechanical properties.

For this purpose, the first subject of the invention is a thermoplastic polymer comprising a thermoplastic polymer block and at least one polyalkylene oxide block, characterized in that:
  a) the thermoplastic polymer block comprises:
    a star- or H-configured macromolecular chain comprising at least one multifunctional core and at least one thermoplastic polymer branch or segment linked to the core, the core comprising at least three identical reactive functional groups; and/or
    a linear macromolecular chain, comprising a difunctional core and at least one thermoplastic polymer segment linked to the core;
  b) the polyalkylene oxide block or blocks are linked to at least some of the free ends of the thermoplastic polymer block in the following manner:
    at least one free end of the star- or H-configured macromolecular chain, chosen from among the ends of the thermoplastic polymer branch or segment and the ends of the multifunctional core, is linked to a polyalkylene oxide block; and/or
    at least one free end of the linear macromolecular chain, chosen from among the ends of the thermoplastic polymer segment and the ends of the difunctional core, is linked to a polyalkylene oxide block, both free ends of the linear macromolecular chain being linked to polyalkylene oxide blocks when the thermoplastic polymer block comprises only linear-type macromolecular chains.

The second subject of the invention is a process for preparing the above polymer, characterized in that the following are made to react:
  on the one hand, polyalkylene oxide blocks possessing reactive terminal functional groups B;
  on the other hand:
  thermoplastic polymer macromolecular chains possessing at least reactive terminal functional groups A and/or
  monomers of at least two types:
    ⇒multifunctional compounds comprising reactive functional groups A
    ⇒monomers each comprising reactive functional groups A and B, the functional groups A and B possibly reacting together to fix the polyalkylene oxide blocks to the thermoplastic polymer macromolecular chains and/or the monomers;

and the above is heated to a temperature high enough to carry out the reaction between these various functional groups.

The invention also relates, and this is the third subject of the invention, to thermoplastic polymer compositions comprising at least:
  a hydrophilic thermoplastic polymer as described above;
  a second thermoplastic polymer, for example such as PA-6 or PA-6,6.

The term "multifunctional core" is understood to mean a core comprising at least three reactive functional groups.

The thermoplastic polymer block, according to a first variant of the first subject of the invention, may comprise star- or H-configured macromolecular chains. Polymers or polymer compositions comprising such star- or H-configured macromolecular chains are, for example, described in patents FR 2 743 077, FR 2 779 730, U.S. Pat. No. 5,959,069, EP 0 632 703, EP 0 682 057 and EP 0 832 149.

The preferred star- or H-configured macromolecular chains according to the invention are chains with a polyamide structure. They are obtained by the use of a multifunctional compound having at least three reactive functional groups, all the reactive functional groups being identical. This compound may be used as a comonomer in the presence of other monomers in a polymerization process. It may also be melt-blended with a polymer during an extrusion operation.

The star- or H-configured macromolecular chains comprise a core and at least one thermoplastic polymer branch, preferably with a polyamide structure. In general, the star- or H-configured macromolecular chains have a core and at least three thermoplastic polymer, preferably polyamide branches. The branches are linked to the core by a covalent bond via an amide group or via a group of another kind, such as for example an ester group. The core is an organic or organometallic chemical compound, preferably a hydrocarbon compound which possibly includes heteroatoms and to which the branches are linked. The branches are preferably polyamide chains. They may have branches between linear chains; this is especially the case for H-configured structures. The chains constituting the branches are preferably polyamide chains of the type of those obtained by the polymerization of lactams or amino acids, for example of the nylon-6 type.

According to one particular embodiment of the first subject of the invention, the star-configured macromolecular chain of the thermoplastic block is a star-configured polyamide obtained by copolymerization from a monomer mixture comprising:

a) a multifunctional compound comprising at least three identical reactive functional groups chosen from the amine functional group and the carboxylic acid functional group;

b) monomers of formulae (IIa) and/or (IIb) below:

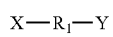 (IIa)

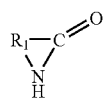 (IIb)

c) where appropriate, monomers of formula (III) below:

 (III)

in which:
Z represents a functional group identical to that of the reactive functional groups of the multifunctional compound;
$R_1$, $R_2$ represent substituted or unsubstituted, aliphatic, cycloaliphatic or aromatic radicals, which may be identical or different, containing from 2 to 20 carbon atoms and possibly including heteroatoms;
Y is a primary amine functional group when X represents a carboxylic acid functional group; or
Y is a carboxylic acid functional group when X represents a primary amine functional group.

The term "carboxylic acid" is understood to mean carboxylic acids and their derivatives, such as acid anhydrides, acid chlorides, esters, etc. The term "amine" is understood to mean amines and their derivatives.

Processes for obtaining these star-configured polyamides are described in Patents FR 2 743 077 and FR 2 779 730. These processes result in the formation of star-configured macromolecular chains, as a blend optionally with linear macromolecular chains.

If a comonomer c) is used, the polymerization reaction (polycondensation) is advantageously carried out as far as thermodynamic equilibrium.

According to one particular embodiment of the first subject of the invention, the H-configured macromolecular chain of the thermoplastic polymer block is an H-configured polyamide obtained by copolymerization from a monomer mixture comprising:

a) a multifunctional compound comprising at least three identical reactive functional groups chosen from the amine functional group and the carboxylic acid functional group.

b) lactams and/or amino acids c) a difunctional compound chosen from dicarboxylic acids or diamines;

d) a monofunctional compound, the functional group of which is either an amine functional group or a carboxylic acid functional group;

the functional groups of c) and d) being amine when the functional groups of a) are acid, the functional groups of c) and d) being acid when the functional groups of a) are amine, the ratio in equivalents of the functional groups of a) to the sum of the functional groups of c) and d) being between 1.5 and 0.66 and the ratio in equivalents of the functional groups of c) to the functional groups of d) being between 0.17 and 1.5.

Such H-configured polyamides and the process for obtaining them are described in the U.S. Pat. No. 5,959,069.

According to one particular embodiment of the first subject of the invention, the thermoplastic polyamide block is obtained by melt-blending, for example using an extruder, of a polyamide, of the type obtained by polymerization of lactams and/or amino acids, and of a multifunctional compound comprising at least three identical reactive functional groups chosen from the amine or carboxylic acid functional group. The polyamide is, for example, nylon-6.

Such production processes are described in patents EP 0 682 070 and EP 0 672 703.

The multifunctional compounds, the monomers resulting in the star- or H-configured macromolecular chains of the invention, may be chosen from compounds having a tree or dendritic structure. They may also be chosen from compounds represented by the formula (IV):

 (V)

in which:
$R_1$ is an aromatic or aliphatic, linear or cyclic, hydrocarbon radical containing at least two carbon atoms and possibly including heteroatoms;
A is a covalent bond or an aliphatic hydrocarbon radical containing from 1 to 6 carbon atoms;
Z represents a primary amine radical or a carboxylic acid radical; and
m is an integer between 3 and 8.

According to a particular characteristic of the invention, the radical $R_1$ is either a cycloaliphatic radical, such as the tetravalent cyclohexanonyl radical, or a propane-1,1,1-triyl or propane-1,2,3-triyl radical.

As other radicals $R_1$ suitable for the invention, mention may be made, by way of example, of substituted or unsubstituted trivalent phenyl and cyclohexanyl radicals, tetravalent diaminopolymethylene radicals with a number of methylene groups advantageously between 2 and 12, such as the radical originating from EDTA (ethylenediaminetetraacetic acid), octovalent cyclohexanonyl or cyclohexanedionyl radicals, and radicals originating from compounds resulting from the reaction of polyols, such as glycol, pentaerythritol, sorbitol or mannitol, with acrylonitrile.

The radical A is preferably a methylene or polymethylene radical, such as the ethyl, propyl or butyl radicals, or a polyoxyalkylene radical, such as the polyoxyethylene radical.

According to a preferred embodiment of the invention, the number m is greater than 3 and advantageously equal to 3 or 4.

The reactive functional group of the multifunctional compound represented by the Z symbol is a functional group capable of forming an amide functional group.

Mention may be made, as examples of polyfunctional compounds, of the compound 2,2,6,6-tetra(β-carboxyethyl)cyclohexanone, the compound diaminopropane-N,N,N',N'-tetraacetic acid of the following formula:

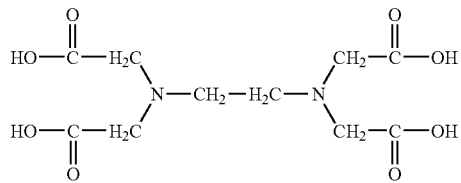

or compounds originating from the reaction of trimethylolpropane or of glycerol with propylene oxide and amination of the end hydroxyl groups; the latter compounds are sold under the trade name JEFFAMINES T® by Huntsman and have the general formula:

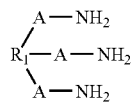

in which:
$R_1$ represents a propane-1,1,1-triyl or propane-1,2,3-triyl radical,
A represents a polyoxyethylene radical.

Examples of suitable multifunctional compounds are, in particular, cited in U.S. Pat. No. 5,346,984, in U.S. Pat. No. 5,959,069, in patent WO 96/35739 and in patent EP 672 703.

The following may more particularly be mentioned:
nitrilotrialkylamines, in particular nitrilotriethylamine, dialkylenetriamines, in particular diethylenetriamine, trialkylenetetramines and tetraalkylenepentamines, the alkylene preferably being ethylene and 4-aminoethyl-1,8-octanediamine.

Mention may also be made of the dendrimers of formula:

$$(R_2N\text{---}(CH_2)_n)_2\text{---}N\text{---}(CH_2)_n\text{---}N\text{---}((CH_2)_n\text{---}NR_2)_2$$

in which
R is a hydrogen atom or a ---$(CH_2)_n$---$NR^1{}_2$ group, in which $R^1$ is a hydrogen atom or a ---$(CH_2)_n$---$NR^2{}_2$ group, in which $R^2$ is a hydrogen atom or a ---$(CH_2)_n$---$NR^3{}_2$ group, in which $R^3$ is a hydrogen atom or a ---$(CH_2)_n$---$NH_2$ group, n being an integer between 2 and 6 and x being an integer between 2 and 14.

n is preferably an integer between 3 and 4, in particular 3, and x is preferably an integer between 2 and 6 inclusive, preferably between 2 and 4 inclusive, in particular 2.

Each radical R may be chosen independently of the others. The radical R is preferably a hydrogen atom or a ---$(CH_2)_n$---$NH_2$ group.

Mention may also be made of multifunctional compounds having 3 to 10, preferably 3 or 4, carboxylic acid groups. Among these, compounds having an aromatic and/or heterocyclic ring are preferred, for example benzyl, naphthyl, anthracenyl, biphenyl and triphenyl radicals, or heterocycles, such as pyridine, bipyridine, pyrrole, indole, furan, thiophene, purine, quinoline, phenanthrene, porphyrine, phthalocyanine and naphthalocyanine. Most particularly preferred are 3,5,3',5'-biphenyltetracarboxylic acid, acids derived from phthalocyanine and from naphthalocyanine, 3,5,3',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, and more particularly still trimesic acid and 1,2,4,5-benzenetetracarboxylic acid. Mention may also be made of multifunctional compounds whose core is a heterocycle having a point of symmetry, such as 1,3,5-triazines, 1,4-diazines, melamine, compounds derived from 2,3,5,6-tetraethylpiperazine, 1,4-piperazines and tetrathiafulvalenes.

Mention may more particularly be made of 1,3,5-triazine-2,4,6-tri(aminocaproic acid) (TTACA).

According to a preferred embodiment of the first subject of the invention, the multifunctional compounds are chosen from 2,2,6,6-tetra-(β-carboxyethyl)-cyclohexanone, trimesic acid, 2,4,6-tri-(aminocaproic acid)-1,3,5-triazine and 4-aminoethyl-1,8-octane diamine.

The monomer mixture resulting in star- or H-configured macromolecular chains of the invention may include other compounds, such as chain stoppers, catalysts and additives, such as light stabilizers, heat stabilizers and delustrants.

According to a second variant of the first subject of the invention, the thermoplastic polymer block comprises a linear macromolecular chain comprising a difunctional core and at least one thermoplastic polymer segment linked to the core.

These linear molecular chains are obtained by using a difunctional compound having two identical reactive functional groups. This compound may be used as comonomer in the presence of other monomers in a polymerization process. It may also be melt-blended with a polymer during a extrusion operation.

The linear macromolecular chains comprise a difunctional core and at least one thermoplastic polymer, preferably polyamide, segment. In general, the linear macromolecular chains have a difunctional core and two thermoplastic polymer, preferably polyamide, segments. The segments are linked to the core by a covalent bond, via an amide group or a group of another kind. The difunctional core is an organic or organometallic chemical compound, preferably a hydrocarbon compound which possibly includes heteroatoms and to which the segments are linked. The segments are preferably polyamide chains. The chains constituting the segments are preferably polyamide chains of the type of those obtained by the polymerization of lactams or amino acids, for example of the nylon-6 type.

According to one particular embodiment of the first subject of the invention, the linear macromolecular chain of the thermoplastic block is a linear polyamide obtained by copolymerization using a monomer mixture comprising:

a) a difunction compound comprising two identical reactive functional groups chosen from the amine functional group and the carboxylic acid functional group;

b) monomers of formulae (Va) and/or (Vb) below:

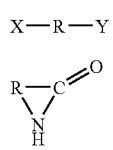

in which:

R represents a substituted or unsubstituted, aliphatic, cycloaliphatic or aromatic hydrocarbon radical containing from 2 to 36 carbon atoms and possibly including heteroatoms;

Y is a primary amine functional group when X is a carboxylic acid functional group;

Y is a carboxylic acid functional group when X is a primary amine functional group.

The monomers of formula (Va) or (Vb) correspond to polyamides of the type obtained by polymerization using lactams and/or aminno acids. The processes for polymerizing such compounds are known: mention may be made inter alia of anionic polymerization and melt polycondensation.

The difunctional compound—the monomer resulting in the linear macromolecular chain of the first subject of the invention—may be chosen from compounds represented by formula (VI):

Z-A-R$_1$—B-Z  (VI)

in which:

R$_1$ is a hydrocarbon radical comprising at least two substituted or unsubstituted, aromatic or aliphatic, linear or cyclic carbon atoms, and which may include heteroatoms;

A and B are covalent bonds or aliphatic hydrocarbon radicals containing from 1 to 6 carbon atoms, A and B being identical or different; and Z is a functional group chosen from the amine functional group and the carboxylic acid functional group.

The radicals R$_1$ and A are preferably methylene or polymethylene radicals, such as ethyl, propyl or butyl radicals, or a polyoxyalkylene radical, such as the polyoxyethylene radical.

Mention may be made of adipic acid as an example of a difunctional compound suitable for the invention.

The difunctional compound may be introduced, for example, into the mixture for polymerizing the linear macromolecular chain of the invention, that is to say into the monomer mixture resulting in the macromolecular chain. It may also be introduced, in the melt, into a mixture comprising the linear macromolecular chain. In the latter case, an extruder allowing the compound and the linear macromolecular chain to be melt-blended can be used.

The radical R of formulae (Va) and (Vb) is advantageously chosen from the following radicals:

the unbranched divalent pentyl radical, the linear macromolecular chain of the thermoplastic polymer block then being a nylon-6;

the unbranched divalent decyl radical (containing 10 carbon atoms), the linear macromolecular chain of the thermoplastic polymer block then being a nylon-11; and the unbranched divalent undecyl radical (containing 11 carbon atoms), the linear macromolecular chain of the thermoplastic polymer block then being a nylon-12.

According to a preferred embodiment of the first subject of the invention, the radical R of formulae (Va) and (Vb) is the unbranched divalent pentyl radical, the linear macromolecular chain of the thermoplastic polymer block then being a nylon-6.

The monomer mixture resulting in the linear macromolecular chains of the invention may include other compounds, such as chain stoppers catalysts and additives, such as light stabilizers, heat stabilizers and delustrants.

According to one particular embodiment of the second variant of the first subject of the invention, the average molecular mass of the linear macromolecular chain is between 200 and 50000 g/mol, preferably between 500 and 3000 g/mol.

According to a variant of the first subject of the invention, the thermoplastic polymer block may comprise both star- or H-configured macromolecular chains and linear macromolecular chains blended together.

According to another particular embodiment of the first subject of the invention, the modified polymer comprises, apart from star- or H-configured macromolecular chains having a multifunctional core and/or linear macromolecular chains having a difunctional core, linear macromolecular chains not containing a multifunctional and/or difunctional core. These linear macromolecular chains not containing a multifunctional and/or difunctional core are especially linear polyamides.

The polyalkylene oxide PAO block of the first subject of the invention is preferably linear. It may be chosen from polyethylene oxide, polytrimethylene oxide and polytetramethylene oxide blocks. If the block is based on polyethylene oxide, it may have propylene glycol units at the ends of the block. The polyalkylene oxide block is preferably a polyethylene oxide block.

The average molecular masses of the thermoplastic polymer blocks and polyalkylene oxide blocks of the invention may be very different. However, preferably they are similar to each other.

The average molecular mass of the PAO blocks is preferably between 200 and 2000 g/mol.

At least some of the free ends of the macromolecular chains of the first subject of the invention are linked to polyalkylene oxide blocks. The free ends of the macromolecular chains denote both:

⇒ the ends of the thermoplastic polymer branches or segments linked to the core;

⇒ the ends of the core which are not linked to thermoplastic polymer branches or segments, in other words the free reactive functional groups of the core.

When the thermoplastic polymer block of the invention comprises only linear-type macromolecular chains, both free ends of the linear macromolecular chains are linked to polyalkylene oxide blocks.

The polyalkylene oxide blocks of the invention are linked to the thermoplastic polymer branches or segments and/or to the core of the thermoplastic polymer block by a covalent bond, via an amide group or a group of another kind.

According to a preferred embodiment of the first subject of the invention, all the free ends of the macromolecular chains of the thermoplastic polymer block are linked to a polyalkylene oxide block.

The present invention also relates to a process for preparing the polymer described above, this being the second subject of the invention.

It consists in making the following react:
on the one hand, polyalkylene oxide blocks possessing reactive terminal functional groups B;
on the other hand:
thermoplastic polymer macromolecular chains possessing at least reactive terminal functional groups A and/or compounds of at least two types:
⇒ multifunctional and/or difunctional compounds comprising reactive functional groups A
⇒ monomers each comprising reactive functional groups A and B and/or a thermoplastic polymer, comprising reactive functional groups A and B, the functional groups A and B possibly reacting together to fix the polyalkylene oxide blocks to the thermoplastic polymer macromolecular chains and/or the monomers and/or the thermoplastic polymer;

and the above is heated to a temperature sufficient to carry out the reaction between these various functional groups.

Everything described above relating to the polyalkylene oxide blocks is identically valid here in the case of the second subject of the invention.

According to a first variant of the second subject of the invention, the thermoplastic polymer macromolecular chains are star- or H-configured chains and/or linear chains. Everything that was described above in regard to the star- or H-configured macromolecular chains or in regard to the linear chains is identically valid here in the case of the second subject of the invention.

According to a second variant of the second subject of the invention, the polyalkylene oxide blocks are made to react with the monomers resulting in the thermoplastic polymer macromolecular chains of the thermoplastic polymer block of the invention. The monomers in question are the multifunctional and/or difunctional compound comprising reactive functional groups A and monomers each comprising reactive functional groups A and B. The monomers resulting in the thermoplastic polymer macromolecular chains are, for example, introduced into a polymerization medium containing polyalkylene oxide blocks. The multifunctional and/or difunctional compound may or may not be introduced simultaneously with the other monomers, having reactive functional groups A and B. Preferably, the multifunctional and/or difunctional compound is introduced after the other monomers having reactive functional groups A and B.

According to a third variant of the second subject of the invention, the polyalkylene oxide blocks are made to react with compounds resulting in the thermoplastic polymer macromolecular chains of the thermoplastic polymer block of the invention. These compounds are the multifunctional and/or difunctional compound comprising reactive functional groups A and a thermoplastic polymer comprising reactive functional groups A and B. These compounds may, for example, be blended with the polyalkylene oxide blocks during an extrusion operation.

Each polyalkylene oxide block may include one or more reactive terminal functional groups B. Preferably, each polyalkylene oxide block contains one reactive terminal functional group B. As examples of polyalkylene oxide blocks, mention may be made of blocks possessing an amine reactive functional group such as JEFFAMINE M 1000® or JEFFAMINE M 2070®.

The terminal functional groups A and B are preferably amine or carboxylic acid functional groups.

According to one particular feature of the second subject of the invention, the terminal functional groups A are carboxylic acid functional groups when the terminal functional groups B are amine functional groups, and vice versa.

The thermoplastic polymer of the invention may be used by itself or as an element of a composition. This thermoplastic polymer may be particularly used as an additive in polymeric compositions, comprising a polymeric matrix. In particular, it is used in the polymeric composition as a compound to modify the hydrophilicity and/or antistatic properties of the polymeric composition. The advantageous polymeric matrices of the compositions of the invention are thermoplastic polymers, especially polyamides. It is known to those skilled in the art that polymers such as polyamides, polyesters, polyolefins and, in particular, PVC form part of the group of thermoplastic polymers.

The third subject of the invention therefore relates to thermoplastic polymer compositions comprising at least:
a first hydrophilic thermoplastic polymer as described above or obtained according to the process described above;
a second thermoplastic polymer, such as PA-6 or PA-6,6 for example.

The second thermoplastic polymer of the composition is preferably a polyamide. The polyamide may be chosen from nylon-6, nylon-6,6, nylon-4,6, nylon-6,10, nylon-11, nylon-12 and blends and copolymers based on these polymers.

The compositions according to the invention are preferably obtained by the melt-blending of the second thermoplastic polymer with the compound modifying the hydrophilicity and/or antistatic behaviour. The blend may, for example, be produced using an extruder, for example a single-screw or twin-screw extruder. The proportion by weight of modifying compound in the composition is preferably between 4 and 20%.

The compositions according to the invention have a morphology in which inclusions of the modifying compound are dispersed within a continuous polyamide phase.

Apart from the modifying compound, the compositions may include other additives such as delustrants, coloured pigments, heat or light stabilizers, heat protection agents, antimicrobial agents, antisoiling agents, antistatic agents or the like. This list is in no way exhaustive.

The compositions may, in particular contain a delustrant consisting of titanium dioxide particles possibly coated so as to protect the polymer from degradation in contact therewith. The titanium dioxide may be used by itself or in combination with other delustrants. The proportion by weight of delustrant in the compositions may be up to a few percent. For example, it is between 0.2 and 0.5% for an effect called "semi-dull", between 0.5 and 1% for an effect called "dull" and between 1% and 3% for an effect called "fully-dull". To obtain what is regarded as a high level of matness, the weight concentration is generally greater than 0.7%.

It is also possible to use zinc sulphide particles as a delustrant, or else a titanium dioxide/zinc sulphide mixture.

The invention also relates to yarns, fibres and filaments obtained by spinning a composition described above. These yarns, fibres or filaments are produced using standard spinning techniques starting with a material comprising the second thermoplastic polymer and the compound for modifying the hydrophilicity and/or antistatic behaviour. The spinning may be carried out immediately after the polymer has been polymerized, the latter being in the melt form, by extrusion through spinnerets. It may be produced from a granulated composite comprising the modifying compound and the polymer. The modifying compound may be incorporated into the polymer melt before the spinning operation, in the form of a concentrated mixture in a polymer. Any of the means of incorporating compounds into a polymer to be spun can be used.

Spinning processes are known. In short, they consist in extruding the molten material through a spinneret and in cooling the filaments obtained. The filaments are generally made to converge beneath the spinneret and are gathered so as to undergo treatments such as drawing, texturizing, sizing, relaxing, dyeing, crimping and heat-setting treatments. The treatments may be carried out on a relatively small number of filaments, for the manufacture of yarns for example, or on a large number of filaments joined together in the form of a cable, lap or roving, for example for the manufacture of fibres or flocked cable.

These complementary operations may be carried out continuously and integrated into the spinning device, or may be carried out batchwise. The list of operations subsequent to spinning is in no way limiting.

The yarns, fibres or filaments according to the invention may be used for the manufacture of textile surfaces. The compositions according to the invention may be used for producing flocked surfaces. The flocked fibres consist in this case either exclusively of fibres of the composition according to the invention, or consist partially thereof, in combination with other fibres.

The yarns, fibres and filaments obtained from the composition exhibit enhanced hydrophilicity and/or antistatic behaviour over that of the unmodified polymer, especially unmodified polyamide, with good retention of these properties after dyeing and/or washing.

The yarns, fibres or filaments according to the invention are in particular suitable for manufacturing textile articles. They may also be used for manufacturing rugs and carpets.

The invention also relates to articles formed from compositions such as those described above.

The composition of the invention, when it is prepared using an extruder, may be produced in the form of granules. The composition or in general more specifically the granules is or are intended to be formed by means of processes involving melting in order to obtain articles, such as for example compression moulding, injection moulding and extrusion-blow moulding. The articles are thus made of the composition.

The use of the compositions according to the invention may be especially advantageous when manufacturing articles for the automobile industry, in particular for manufacturing body parts. The antistatic and/or hydrophilicity properties of the modifying compound of the composition may be advantageous in these articles.

Further details and advantageous of the invention will become more clearly apparent in the light of the examples given below solely by way of indication.

EXAMPLES

Example 1

Preparation of a Hydrophilic Star-Configured Polyamide

The following were introduced into a one-litre autoclave fitted with a mechanical stirrer:
336 g of α-caprolactam
12.31 g of 1,3,5-benzenetricarboxylic acid
0.7 g of ULTRANOX® 236
300 µl of a 50 wt % aqueous hypophosphorous acid.

The reaction mixture was heated to 220° C. in nitrogen at atmospheric pressure and kept at this temperature for 30 minutes.
352 g of JEFFAMINE® M 2070 were then gradually added over 20 minutes.
The reaction mixture was heated to 260° C. and kept at this temperature for 1 h. Next, a vacuum down to a pressure of 5 mbar was gradually imposed on the system over 1 h.
The system was then cast on a plate.

Example 2

Preparation of a Hydrophilic Tribloc Linear Polyamide

The following were introduced into a one-litre autoclave fitted with a mechanical stirrer:
350 g of ε-caprolactam
12.92 g of adipic acid
0.7 g of ULTRANOX® 236
300 µl of a 50 wt % aqueous hypophosphorous acid.

The reaction mixture was heated to 220° C. in nitrogen at atmospheric pressure and kept at this temperature for 30 minutes.
354 g of JEFFAMINE® M 2070 were then gradually added over 40 minutes.
The reaction mixture was heated to 260° C. and kept at this temperature for 80 min. Next, a vacuum down to a pressure of 5 mbar was gradually imposed on the system over 1 h.
The system was then cast on a plate.

Example 3

Preparation of a Hydrophilic Star-Configured Polyamide

The following were introduced into a 200 ml reactor fitted with a mechanical stirrer:
59.4 g of ε-caprolactam
87.6 g of JEFFAMINE® M 2070.

The reaction mixture was heated to 260° C. in nitrogen and at atmospheric pressure and kept at this temperature for 4 h.
3.1 g of 1,3,5-benzenetricarboxylic acid were added. The mixture was kept for two hours at 260° C. in nitrogen. A vacuum down to a pressure of 38 mbar was then gradually imposed on the reactor over 30 min.

Examples 4-6

Preparation of Hydrophilic PA Compositions

Materials Used:
Polyamide A1: nylon-6,6 containing 0.3 wt % titanium dioxide, having a relative viscosity of 41 (measured with 8.4% of polymer in 90% formic acid);
Additive B1: hydrophilic star-configured polyamide of Example 1;
Additive C: hydrophilic tribloc linear polyamide of Example 2;
Additive D: JEFFAMINE® M2070 sold by Huntsman; a random polymer with a propylene oxide/ethylene oxide ratio of 10/32, the average molecular mass of which is 2000 g/mol.

Granules comprising the polyamide and one of the additives were prepared by extrusion in a twin-screw extruder with each of the constituents being fed in granule form. The compositions thus produced are given in Table 1.

TABLE 1

|  | Example 4 | Example 5 | Comparative Example 6 |
|---|---|---|---|
| Polyamide A1 (wt %) | 90% | 90% | 90% |
| Additive (wt %) | B1-10% | C-10% | D-10% |

Yarns were melt spun at 285° C. from the granules prepared. The yarn was wound up at a rate of 4200 m/min and had a linear density of 45 dtex for 10 filaments. The filaments from several wound packages were woven so as to form socks 5 cm in diameter.

The moisture uptake of the compositions was measured by weight variation after a residence time of 48 hours in a chamber conditioned to a relative humidity of 94% at 30° C. or 54% at 30° C. and then held for 16 h in an oven regulated to 80° C. at a pressure of 7 mm of mercury. The moisture uptake is calculated as follows:

Moisture uptake=(wet mass−dry mass)/dry mass; the results are given in Table 2.

TABLE 2

|  | Examples | | |
|---|---|---|---|
|  | 4 | 5 | 6 (comparative) |
| Moisture absorption at 94% RH | 9.0% | 8.1% | 7.8% |
| Moisture absorption at 54% RH | 2.0% | 1.9% | 2.0% |

The adhesion of the additives to the matrix is determined by the difference in weight before and after washing. The washing operation simulates the treatments that the product may have undergone: dyeing, washing.

4 g of the composition were ground at cryogenic temperature with a RETSCH® Ultra-centrifuge ZM 1000 grinder fitted with a 1 mm mesh. The powders were then dried at 80° C. for 48 hours and weighed. A 10% solution in demineralized water (4 g of powder for 36 g of water) was prepared. The solution was then kept stirred by magnetic stirring at 500 rpm for 36 minutes at room temperature. The solution was then filtered over a No. 11 (PROLABO®) filter and both the filtrate and the cake were dried at 80° C. for 48 hours and weighed.

The weight loss (amount released) was then calculated:
Weight loss=(mass before washing−mass after washing)/mass before washing.

The results are given in Table 3.

TABLE 3

|  | Examples | | |
|---|---|---|---|
|  | 4 | 5 | 6 (comparative) |
| Amount released (wt %) | 5.0% | 15.0% | 20.0% |

Examples 7-17

Preparation of Hydrophilic PA Compositions

Materials Used:
Polyamide A2: nylon-6,6 containing no titanium dioxide, having a relative viscosity of 41 (measured with 8.4% polymer in 90% formic acid);
Polyamide A3: nylon-6,6 containing 1.5 wt % titanium dioxide, having a relative viscosity of 41 (measured with 8.4% polymer in 90% formic acid);
Polyamide A4: nylon-6 containing less than 0.03 wt % titanium dioxide, having a relative viscosity of 2.06 (measured with 1% polymer in 90% sulphuric acid);
Additive B2: hydrophilic star-configured polyamide of Example 3.

Yarns comprising the polyamide and one of the additives were prepared by blending, in a single-screw spinning extruder with each of the constituents being fed in granule form and melt spinning at a temperature of 285° C. or 260° C. in the case of nylon-6,6 and nylon-6, respectively. The yarn was wound up at a rate of 4200 m/min and with various linear densities.

The compositions thus produced are given in Table 4.

TABLE 4

| Examples | Polyamide (wt %) | Additive (wt %) | Linear density of the yarn | |
|---|---|---|---|---|
|  |  |  | dtex | Number of filaments |
| 7 | A2-93% | B2-7% | 78 | 23 |
| 8 | A2-93% | B2-7% | 78 | 68 |
| 9 | A2-94.5% | B2-5.5% | 44 | 34 |
| 10 | A1-93% | B2-7% | 78 | 23 |
| 11 | A3-93% | B2-7% | 78 | 68 |
| 12 | A3-94.5% | B2-5.5% | 44 | 34 |
| 13 | A4-94.5% | B2-5.5% | 44 | 12 |
| 14 | A4-96% | B2-4% | 44 | 12 |
| 15 | A4-94% | B2-6% | 44 | 12 |
| 16 | A4-96% | B2-4% | 55 | 12 |
| 17 | A4-94% | B2-6% | 55 | 12 |

The moisture uptake of the compositions was measured in the same way as in the Examples 4 to 6, at a relative humidity of 94% at 30° C., on powders prepared as follows:

4 g of composition were ground at cryogenic temperature with a RETSCH® Ultra-centrifuge ZM 1000 grinder fitted with a 1 mm mesh. The powders were then dried at 80° C. for 48 hours and weighed.

The results are given in Table 5.

TABLE 5

| | Examples | | | | | | | | | | |
|---|---|---|---|---|---|---|---|---|---|---|---|
| | 7 | 8 | 9 | 10 | 11 | 12 | 13 | 14 | 15 | 16 | 17 |
| 94% RH moisture absorption (%) | 9-9.2 | 9-9.2 | 8-8.5 | 9-9.2 | 9-9.2 | 8-8.5 | 9 | 8.5 | 9.5 | 8.2 | 9.6 |

The adhesion of the additives to the matrix was determined in the same way as in Examples 4 to 6.

The amount released (wt %) from the compositions of Examples 7 to 12 is less than 6, that from the compositions of Examples 13 to 17 being less than 0.3.

Examples 18-13

Preparation of Hydrophilic Polymer Compositions

Materials Used;
A5: polyethylene terephthalate (reference MTV1160);
A6: polybutylene terephthalate;
A7: polypropylene (reference PROFAX® 6301);
Additive B2.

Granules containing the polymer and one of the additives were prepared by extrusion in a twin-screw extruder with each of the constituents being fed in granule form. The compositions thus produced are given in Table 6. The moisture uptake of the compositions and the adhesion of the additives to the matrix were determined on powder, in the same way as in Examples 7 to 17. The results are also given in Table 6.

TABLE 6

|  | Examples | | | | | |
| --- | --- | --- | --- | --- | --- | --- |
|  | 18 | 19 | 20 | 21 (comparative) | 22 (comparative) | 23 (comparative) |
| Polymer (wt %) | A5-90% | A6-90% | A7-90% | A5-100% | A6-100% | A7-100% |
| Additive (wt %) | B2-10% | B2-10% | B2-10% | — | — | — |
| 94% RH moisture absorption (%) | 1.1 | 0.4 | 0.7 | 0.5 | — | 0.4 |
| Amount released (wt %) | <<3 | ~3 | ~3 | — | — | — |

The invention claimed is:

1. Thermoplastic polymer comprising a thermoplastic polymer block and at least one polyalkylene oxide block, wherein:
   a) the thermoplastic polymer block comprises:
      a star-configured macromolecular polyamide chain comprising at least one multifunctional core and at least one thermoplastic polymer branch or segment linked to the core, the core comprising at least three identical reactive functional groups;
   and
      optionally a linear macromolecular chain, comprising a difunctional core and at least one thermoplastic polymer segment linked to the core;
   b) the polyalkylene oxide block or blocks are linked to at least some of the free end of the thermoplastic polymer block in the following manner:
      at least one free end of the star-configured macromolecular chain, selected from among the ends of the thermoplastic polymer branch or segment and the ends of the multifunctional core, is linked to a polyalkylene oxide block;
   and
      optionally at least one free end of the linear macromolecular chain, selected from among the ends of the thermoplastic polymer segment and the ends of the difunctional core, is linked to a polyalkylene oxide block wherein the polyalkylene oxide block linked to the at least some of the free end of the thermoplastic polymer block comprises a single reactive terminal functional group.

2. Thermoplastic polymer according to claim 1, wherein the star-configured macromolecular polyamide chain is a star-configured polyamide obtained by copolymerization from a monomer mixture comprising:
   a) a multifunctional compound comprising at least three identical reactive functional groups selected from the amine functional group and the carboxylic acid functional group;
   b) monomers of formulae (IIa) and/or (IIb) below:

$$X-R_1-Y \quad \text{(IIa)}$$

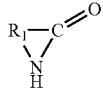

(IIb)

c) optionally, monomers of formula (III) below:

$$Z-R_2-Z \quad \text{(III)}$$

in which:
   Z represents a functional group identical to that of the reactive functional groups of the multifunctional compound;
   $R_1$, $R_2$ represent substituted or unsubstituted, aliphatic, cycloaliphatic or aromatic radicals, which may be identical or different, comprising from 2 to 20 carbon atoms and optionally comprising heteroatoms;
   Y is a primary amine functional group when X represents a carboxylic acid functional group; or
   Y is a carboxylic acid functional group when X represents a primary amine functional group.

3. Thermoplastic polymer according to claim 1, wherein the thermoplastic polymer block is obtained by extruding a blend comprising a polyamide, of the type obtained by polymerization of lactams and/or amino acids, and of a multifunctional compound comprising at least three identical reactive functional groups selected from the amine or carboxylic acid functional group.

4. Thermoplastic polymer according to claim 2, wherein the multifunctional compound has a dendritic structure.

5. Thermoplastic polymer according to claim 2, wherein the multi-functional compound is selected from compounds represented by the formula (IV):

$$R1-[A-z]_m \quad \text{(IV)}$$

in which:
R$_1$ is an aromatic or aliphatic, linear or cyclic, hydrocarbon radical comprising at least two carbon atoms and optionally comprising heteroatoms;
A is a covalent bond or an aliphatic hydrocarbon radical comprising from 1 to 6 carbon atoms;
Z represents a primary amine radical or a carboxylic acid radical; and
m is an integer between 3 and 8.

6. Thermoplastic polymer according to claim 5, wherein the multifunctional compound is selected from 2,2,6,6-tetra (β-carboxyethyl)-cyclohexanone, trimesic acid, 2,4,6-tri (aminocaproic acid)-1,3,5-triazine and 4-aminoethyl-1,8-octane diamine.

7. Thermoplastic polymer according to claim 1, wherein the linear macromolecular chain of the thermoplastic polymer block is a linear polyamide obtained by copolymerization using a monomer mixture comprising:
a) a difunctional compound comprising two identical reactive functional groups selected from the amine functional group and the carboxylic acid functional group;
b) monomers of formulae (Va) and/or (Vb) below:

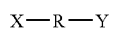 (Va)

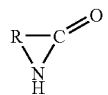 (Vb)

in which:
R represents a substituted or unsubstituted, aliphatic, cycloaliphatic or aromatic hydrocarbon radical containing from 2 to 36 carbon atoms and optionally comprising heteroatoms;
Y is a primary amine functional group when X is a carboxylic acid functional group;
Y is a carboxylic acid functional group when X is a primary amine functional group.

8. Thermoplastic polymer according to claim 7, wherein R is a divalent linear radical.

9. Thermoplastic polymer according to claim 7, wherein the difunctional compound is represented by formula (VI):

 (IV)

in which:
R$_1$ is a hydrocarbon radical comprising at least two substituted or unsubstituted, aromatic or aliphatic, linear or cyclic carbon atoms, and which may include heteroatoms;
A and B are covalent bonds or aliphatic hydrocarbon radicals containing from 1 to 6 carbon atoms, A and B being identical or different; and
Z is a functional group selected from the amine functional group and the carboxylic acid functional group.

10. Thermoplastic polymer according to claim 1, which comprises linear polyamide macromolecular chains not containing multifunctional and/or difunctional cores.

11. Thermoplastic polymer according to claim 1, wherein the polyalkylene oxide block is linear.

12. Thermoplastic polymer according to claim 1, wherein the polyalkylene oxide block is a polyethylene oxide block.

13. Thermoplastic polymer according to claim 1, wherein all the free ends of the macromolecular chain of the thermoplastic polymer block are linked to a polyalkylene oxide block.

14. Process for preparing a thermoplastic polymer according to claim 1, wherein the following are made to react:
on the one hand, polyalkylene oxide blocks possessing reactive terminal functional groups B;
the other hand:
thermoplastic polymer macromolecular chains possessing at least reactive terminal functional groups A
and/or
compounds of at least two types:
⇒ multifunctional and/or difunctional compounds comprising reactive functional groups A
⇒ monomers each comprising reactive functional groups A and B and/or a thermoplastic polymer comprising reactive functional groups A and B,
the functional groups A and B optionally reacting together to fix the polyalkylene oxide blocks to the thermoplastic polymer macromolecular chains and/or the monomers and/or the thermoplastic polymer;
and the above is heated to a temperature high enough to carry out the reaction between these various functional groups.

15. Process according to claim 14, wherein the reactive terminal functional groups A and B are selected from carboxylic acid functional groups and amine functional groups.

16. Process according to claim 14, wherein:
the terminal functional groups A are carboxylic acid functional groups when the terminal functional groups B are amine functional groups;
the terminal functional groups B are carboxylic acid functional groups when the terminal functional groups A are amine functional groups.

17. An additive for addition to a polymeric composition, the additive comprising the thermoplastic copolymer according to claim 1.

18. Thermoplastic polymer composition comprising at least:
a first hydrophilic thermoplastic polymer according to claim 1;
a second thermoplastic polymer comprising PA-6 or PA-6,6.

19. Thermoplastic polymer composition according to claim 18, wherein the second thermoplastic polymer is a polyamide selected from PA-6, PA-11, PA-12, PA-6,6, blends thereof and copolymers thereof.

20. Thermoplastic polymer composition according to claim 18, wherein the proportion by weight of the first thermoplastic polymer in the composition is between 4 and 20%.

21. Thermoplastic polymer composition according to claim 18, which further comprises additives and optionally delustrants.

22. Thermoplastic polymer composition according to claim 18, which further comprises fillers.

23. Yarns, fibers and filaments obtained by melt spinning a composition according to claim 18.

24. Textile article obtained from yarns, fibers and filaments according to claim 23.

25. Article formed from a composition according to claim 18.

* * * * *